(12) United States Patent  (10) Patent No.: US 9,249,362 B2
Harris et al.  (45) Date of Patent: Feb. 2, 2016

(54) SEPARATION OF PRODUCT STREAMS

(75) Inventors: John William Harris, Amsterdam (NL);
Colin John Schaverien, Amsterdam
(NL); Nicolaas Wilhelmus Joseph Way,
Amsterdam (NL)

(73) Assignee: Shell Oil Company, Houston, TX (US)

( * ) Notice: Subject to any disclaimer, the term of this patent is extended or adjusted under 35 U.S.C. 154(b) by 941 days.

(21) Appl. No.: 13/453,863

(22) Filed: Apr. 23, 2012

(65) Prior Publication Data

US 2012/0271075 A1  Oct. 25, 2012

(30) Foreign Application Priority Data

Apr. 21, 2011 (EP) .................................. 11163487

(51) Int. Cl.
*C07C 1/00* (2006.01)
*B01J 8/00* (2006.01)
*C10G 3/00* (2006.01)
*B01D 45/12* (2006.01)
*B01J 8/26* (2006.01)
*C10G 11/18* (2006.01)
*C10G 1/08* (2006.01)

(52) U.S. Cl.
CPC  *C10G 3/57* (2013.01); *B01D 45/12* (2013.01);
*B01J 8/0055* (2013.01); *B01J 8/26* (2013.01);
*C10G 1/08* (2013.01); *C10G 11/18* (2013.01);
*B01J 2219/00006* (2013.01); *C10G 2300/104*
(2013.01); *C10G 2300/1011* (2013.01); *C10G 2300/1044* (2013.01); *C10G 2300/1051*
(2013.01); *C10G 2300/1055* (2013.01)

(58) Field of Classification Search
CPC .............. C10G 3/10; B01J 8/00; B01J 38/12;
B01D 46/16

USPC ........................... 585/240, 242; 422/139, 144
See application file for complete search history.

(56) References Cited

U.S. PATENT DOCUMENTS 6,971,594 B1 * 12/2005 Polifka ............................ 241/5
7,718,140 B1 * 5/2010 Seibert et al. .................. 422/147
8,057,641 B2 * 11/2011 Bartek et al. ..................... 201/12
8,288,599 B2 * 10/2012 Yanik et al. ..................... 585/240
8,288,600 B2 * 10/2012 Bartek et al. ................... 585/240
8,558,043 B2 * 10/2013 Yanik et al. ..................... 585/240
8,779,225 B2  7/2014 Boon et al.

(Continued)

FOREIGN PATENT DOCUMENTS

CN  1270984  10/2000
CN  101558135  10/2009

(Continued)

OTHER PUBLICATIONS

Lee, et al.: "Influence of Reaction Temperature, Pretreatment, and a Char Removal System on the Production of Bio-oil from Rice Straw by Fast Pyrolysis, Using a Fluidized Bed", Energy & Fuels, vol. 19, No. 5, Sep. 1, 2005, pp. 2179-2184, XP55013487.
Chinese Office Action for CN201280027542.7 dated May 8, 2014; 12 pages.

(Continued)

*Primary Examiner* — Nina Bhat

(57) ABSTRACT

A method of purifying a vapor product stream obtained from cracking of biomass catalyzed by a fluidized solid catalyst is provided. The catalyst is separated from the vapor product stream to provide a de-catalyzed vapor product stream. Solid biomass residue is cyclonically separated from the de-catalyzed vapor product stream to provide a purified vapor product stream.

14 Claims, 3 Drawing Sheets

(56) References Cited

U.S. PATENT DOCUMENTS

| | | |
|---|---|---|
| 2008/0134892 A1* | 6/2008 | Claude .......................... 95/271 |
| 2008/0216655 A1 | 9/2008 | Vimalchand et al. |
| 2009/0142241 A1* | 6/2009 | Huziwara et al. ............. 422/219 |
| 2010/0105970 A1 | 4/2010 | Yanik et al. |
| 2011/0251047 A1* | 10/2011 | Niccum et al. .................. 502/38 |
| 2013/0276360 A1 | 10/2013 | Boon et al. |

FOREIGN PATENT DOCUMENTS

| | | |
|---|---|---|
| EP | 1892280 | 2/2008 |
| WO | 2006031011 | 3/2006 |
| WO | 2009143017 | 11/2009 |
| WO | 2010002792 | 1/2010 |
| WO | 2010068255 | 6/2010 |

* cited by examiner

SEPARATION OF PRODUCT STREAMS

The present application claims the benefit of European Patent Application No. 11163487.9, filed Apr. 21, 2011 the entire disclosure of which is hereby incorporated by reference.

FIELD OF THE INVENTION

The invention relates to the fluid catalytic cracking of biomass. In particular, though not exclusively, the invention relates to methods and apparatus for enhancing the purity of product streams obtained from fluid catalytic cracking of biomass.

BACKGROUND OF THE INVENTION

With the diminishing supply of crude mineral oil and fossil fuels in general, use of renewable energy sources is becoming increasingly important for the production of liquid fuels. These fuels from renewable energy sources are often referred to as biofuels.

Biofuels derived from non-edible renewable energy sources, such as cellulosic materials, are preferred as these do not compete with food production. These biofuels are also referred to as second generation biofuels or advanced biofuels. Most of these non-edible renewable energy sources, however, are solid biomass materials that are somewhat cumbersome to convert into liquid fuels.

One process that can be used for converting solid biomass into liquid fuels or other useful chemicals is fluid catalytic cracking (FCC), which has been widely used for some decades in fossil fuel refining.

Fluid catalytic cracking comprises mixing hot regenerated catalyst with a hydrocarbon feedstock in a riser reactor under catalytic cracking reaction conditions. This causes the feedstock to be cracked to yield hydrocarbon vapours (including for example gasoline-range boiling hydrocarbons, diesel-range boiling hydrocarbons, dry gas, liquefied petroleum gas and other hydrocarbons) as well as degradation products, for example coke, which deposit on the catalyst causing a reduction in catalytic activity. Hydrocarbon vapours and coked catalyst are passed from the top of the riser reactor to a separator vessel where catalyst is separated from hydrocarbon vapours. The separated catalyst is then passed to a stripper where it is contacted with a stripping gas to remove volatile product hydrocarbons. The stripped catalyst is then passed to a separate regeneration vessel where coke is oxidised from the catalyst. Catalyst having had a substantial portion of the coke removed is then passed to a regenerated catalyst standpipe to the riser reactor for cyclic reuse in the process.

Of particular concern in the field of fluid catalytic cracking has been the development of methods and systems for separating hydrocarbon vapours from catalyst particles under efficient separating conditions so as to reduce overcracking and improve product purity. Patent publications EP-A-162978, EP-A-629679, U.S. Pat. No. 5,248,411 and EP-A-604026 all describe developments concerned with the rapid separation and recovery of entrained catalyst particles from hydrocarbon vapour. The rapid separation is achieved in that the catalyst is separated from the reactor riser effluent in a first cyclone separator in fluid connection with a second cyclone. This cyclone line-up in fluid catalytic cracking reactors is also referred to as close-coupled cyclone separation provided that the primary and secondary cyclones are contained in one larger vessel.

More recently, fluid catalytic cracking has been proposed to process biomass, especially solid biomass. WO2010/135734 describes a method for co-processing a biomass feedstock and a refinery feedstock in a refinery unit comprising catalytically cracking the biomass feedstock and the refinery feedstock in a refinery unit comprising a fluidized reactor, wherein hydrogen is transferred from the refinery feedstock to carbon and oxygen of the biomass feedstock. In one of the embodiments in WO2010/135734, the biomass feedstock comprises a plurality of solid biomass particles having an average size between 50 and 1000 microns. In passing, it is further mentioned that solid biomass particles can be pre-processed to increase brittleness, susceptibility to catalytic conversion (e.g. by roasting, toasting, and/or torrefication) and/or susceptibility to mixing with a petrochemical feedstock.

A drawback of many prior art fluid catalytic cracking processes for converting biomass is that they are often based on equipment and/or principles of fluid catalytic cracking processes originally designed for fossil fuel feedstocks, particularly refinery feedstocks. This can lead to processes that are prone to providing impure products and/or require more frequent maintenance or component replacement.

It is an object of the invention to provide a method and/or apparatus that address at least one problem associated with the prior art.

SUMMARY OF THE INVENTION

It has now been found that certain methods and separator arrangements for purifying FCC streams can greatly improve the purity of vapour product streams obtained from fluid catalytic cracking of biomass, e.g. in a riser reactor, whilst also enhancing process reliability and component durability.

In one embodiment of the invention, a method of purifying a vapour product stream obtained from cracking of biomass catalysed by a fluidised solid catalyst is provided, the method comprising: a) separating catalyst from the vapour product stream to provide a de-catalysed vapour product stream; and b) cyclonically separating solid biomass residue from the de-catalysed vapour product stream to provide a purified vapour product stream, wherein cyclonically separating solid biomass residue comprises bringing the de-catalysed vapour product stream to a gas velocity in the range of from 35 to 80 m/s.

The gas velocity in step b) is suitably measured at the cyclone outlet.

In another embodiment, a process for converting a biomass material into a purified vapour product stream is provided, the process comprising:

contacting the biomass material with a fluidised solid catalytic cracking catalyst to obtain a vapour product stream comprising one or more at least one cracked products and solid biomass residue; and purifying the vapour product stream according to the the process described above to provide a purified product stream.

Yet in another embodiment, a separator arrangement for separating solids from a vapour product stream obtained from cracking of biomass catalysed by a fluidised solid catalyst is provided, the separator arrangement comprising:

a catalyst separating unit for separating solid catalyst from the vapour product stream to provide a de-catalysed vapour product stream; and a cyclonic residue separator for separating solid biomass residue from the de-catalysed vapour product stream that is operatively connected to the catalyst separation unit.

Yet in another embodiment, a fluid catalytic cracking reactor or unit for converting a biomass material into a purified vapour product stream is provided, the reactor or unit comprising:

a reactor vessel for contacting containing biomass material and with a fluidised solid catalytic cracking catalyst; and a separator arrangement according to the arrangement described above that is operatively connected to the reactor vessel.

BRIEF DESCRIPTION OF THE DRAWINGS

In order that the invention may be readily understood, reference will now be made, by way of example, to the accompanying drawings in which.

DETAILED DESCRIPTION OF THE INVENTION

Figure 1:
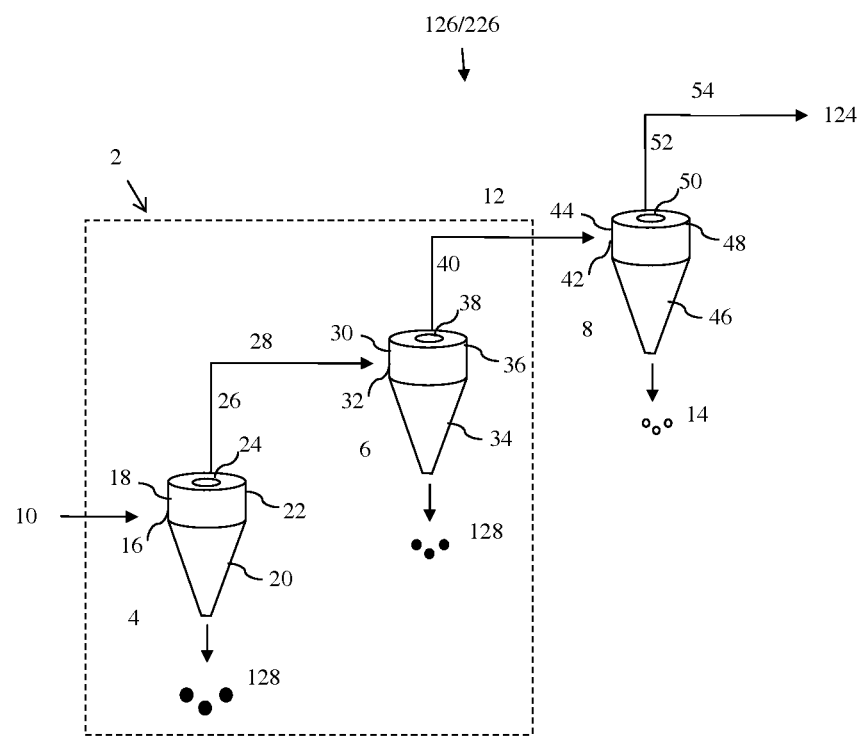
FIG. 1 shows a schematic diagram of a separator arrangement of one embodiment of the invention.

By cyclonically separating solid biomass residue after separating catalyst from the vapour product stream, product stream purity is enhanced in an efficient and durable manner. Specifically, it has been found that, once catalyst has been removed from the vapour product stream, it is possible to separate cyclonically solid but typically fine, light, soft and non-combustible residues (sometimes also referred to as ashes) that result from catalytic cracking of biomass, using high gas velocities that would otherwise lead to increased or unacceptable cyclonic abrasion or erosion.

Without wishing to be bound by any kind of theory it is believed that if a fluidised solid catalyst would be cyclonically separated from the vapour product stream at such high gas velocities, unacceptable abrasion and/or erosion of the inner cyclone wall would occur. On the other hand, when attempting to cyclonically separate solid biomass residue at a gas velocity generally used for separating a fluidised solid catalyst, the achieved separation may be suboptimal.

With the process according to the invention an increased separation of solid biomass residue may be achieved whilst essentially maintaining hardware integrity. This in turn means that it is possible to enhance product purity without causing increased or unacceptable component wear.

In step a) of the method according to the invention comprises separating catalyst from the vapour product stream to provide a de-catalysed vapour product stream.

Separating the catalyst from the vapour product stream may comprise passing the vapour product stream through a plurality of primary cyclonic separators linked in series, e.g. a close-coupled cyclone unit. Therefore, expressed in another way, the present invention encompasses a purifying method in which a vapour product stream is passed through three or more cyclonic separators.

To mitigate wear, separating the catalyst from the vapour product stream may comprise passing the vapour product stream through one or more primary cyclonic separators at a relatively low gas velocity in the range of from 15 to 28 m/s or 17 to 24 m/s, particularly in a first primary separator. Second or further primary separators may be able to operate at a relatively moderate velocity, e.g. in the range of from 30 to 45 m/s or 34 to 43 m/s or 34 to 40 m/s. All gas velocities are measured at the relevant cyclone outlet.

Step b) comprises cyclonically separating solid biomass residue from the de-catalysed vapour product stream to provide a purified vapour product stream, wherein cyclonically separating solid biomass residue comprises bringing the de-catalysed vapour product stream to a gas velocity in the range of from 35 to 80 m/s. Advantageously, cyclonically separating the solid biomass residue may comprise bringing the de-catalysed vapour product stream to a peak gas velocity. By "peak gas velocity" is meant that the gas velocity during cyclonic separation of the solid biomass residue is higher than at any other stage of the method. For instance, the vapour product stream may have one or more primary gas velocities when passed through primary cyclonic separators (e.g. as described above), and cyclonically separating the solid biomass residue may comprise bringing the de-catalysed vapour product stream to a peak gas velocity that is relatively high, i.e. higher, e.g. by at least 5%, 10% or even 20%, than the primary gas velocity or velocities. Gas velocity during any cyclonic separation may conveniently be taken as the gas velocity measured at the relevant cyclone or cyclonic separator outlet.

Cyclonically separating the solid biomass residue may comprise passing the de-catalysed vapour product stream through one or more cyclones and/or swirl separators, e.g. swirl tubes as are known in the art as third stage separators in FCC regenerators.

To ensure a good degree of product purity, cyclonically separating the solid biomass residue comprises bringing the de-catalysed vapour product stream to a gas velocity in the range of from 35 to 80 m/s, as suitably measured at the relevant cyclone outlet. Preferably, in a cyclone, the gas velocity may be in the range of from 35 to 70 m/s, or in the range of from 45 to 60 m/s, or even in the range of from 46 to 55 m/s.

Where a swirl separator is employed, even higher gas velocities are preferred, for example gas velocities in the range of from 45 to 80 m/s, preferably from 50 to 70 m/s.

Whilst gas velocity is a good indicator of both cyclonic performance and the risk of associated cyclonic wear (i.e. a high velocity leads to better separation but also a greater vulnerability to wear within the cyclone), cyclonic performance may also be expressed in terms of a "cut point". The cut point of a cyclone or cyclone separation step represents the size of particle that will be removed from the processed stream with 50% efficiency. Particles larger than the cut point will be removed with a greater efficiency, and smaller particles with a lower efficiency. Similarly, cyclonic performance can be measured based on an average particle size of solids remaining after a cyclone or cyclonic separation step.

The method according to the one embodiment of the invention may comprise a) separating catalyst from the vapour product stream to achieve a primary average particle size in the de-catalysed vapour product stream, and b) cyclonically separating solid biomass residue from the de-catalysed vapour product stream to achieve an average particle size in the purified vapour product stream that is lower than the primary average particle size.

The method may comprise separating catalyst from the vapour product stream such that the average particle size of solids remaining in the de-catalysed product stream is greater than 5 microns, typically greater than 10 microns or even greater than 20 microns, e.g. in the range of from 10 to 50 microns or 10 to 25 microns.

Cyclonically separating the biomass residue may lead to a vapour product stream with an average particle size of solids remaining therein of less than 10 microns, preferably less than 5 microns, such as for example in the range of from 1 to 4 microns or even 1 to 3 microns.

As aforesaid, separation of catalyst from the vapour product stream allows for more efficient and less wear-inducing subsequent removal of solid biomass residues. The method according to the first aspect of the invention may comprise separating at least 98 wt %, preferably at least 99 wt %, or at least 99.5 wt %, or even at least 99.8 wt % or at least 99.9 wt % of the catalyst and/or total solids from the vapour product stream to provide the de-catalysed vapour product stream. Ideally, the method may comprise separating substantially all catalyst from the vapour product stream to provide a de-catalysed product stream that is essentially free from catalyst. Average particle sizes and wt % of catalyst or solids are measured herein by isokinetic dust sampling according to BS 3405. Alternatively, a suitable method to estimate separation efficiency (in wt %) is provided by Particulate Solid Research Inc. (PSRI) with their "Tornado—Cyclone Evaluation Tool" and "Oust—PSRI Entrainment Software".

The invention also embraces, according to another embodiment, a process for converting a biomass material into a purified vapour product stream, the process comprising: contacting biomass material with a fluidised solid catalytic cracking catalyst to obtain a vapour product stream comprising one or more cracked products and solid biomass residue; and purifying the vapour product stream according to any of the methods of purifying described herein.

Preferably, the biomass may be contacted with the catalytic cracking catalyst at a temperature of more than 400° C. in the presence of a fluid hydrocarbon co-feed.

The purified vapour product stream may be processed further, for example fractionated to obtain a plurality of purified fractions.

The invention also encompasses separator arrangements, reactors and systems including means for performing the methods or processes described herein.

From another embodiment, in a separator arrangement for separating solids from a vapour product stream obtained from cracking of biomass catalysed by a fluidised solid catalyst, the separator arrangement comprised: a catalyst separating unit for separating solid catalyst from the vapour product stream to provide a de-catalysed vapour product stream; and a cyclonic residue separator that is operatively connected to the catalyst separating unit for separating solid biomass residue from the de-catalysed vapour product stream.

The catalyst separator unit may be arranged to separate at least 98 wt %, preferably at least 99 wt %, or at least 99.5 wt %, or even at least 99.8 wt % or at least 99.9 wt % of the catalyst from the vapour product stream to provide the de-catalysed vapour product stream. The separator unit may preferably comprise a plurality of, most preferably two, primary cyclonic separators in series.

To provide a good degree of purity without excessive wear, the cyclonic residue separator and the primary cyclonic separators may be arranged such that the cyclonic residue separator operates at a gas velocity which is higher than the gas velocities of the primary cyclonic separators. Additionally or alternatively, the cyclonic residue separator may have a lower cut point and/or lead to a lower remaining average particle size than the primary cyclonic separators.

In another embodiment, a fluid catalytic cracking reactor or unit for converting a biomass material into a purified vapour product stream, the reactor or unit comprises: a reactor vessel for contacting biomass material with a fluidised solid catalytic cracking catalyst to obtain a vapour product stream comprising at least one cracked product; and a separator stage as described herein or operating according to any method described herein.

Where context permits, preferred features of each aspect of the invention may be as described in connection with any of the other aspects.

With reference to FIG. 1, a separator arrangement (126/226) comprises a catalyst separating unit (2) having primary cyclonic separators in the form of first and second cyclones (4), (6) and a cyclonic residue separator in the form of a third cyclone (8).

The separator arrangement (126/226) is arranged to purify a vapour product stream (10) obtained from cracking of biomass catalysed by a fluidised solid catalyst (not shown in FIG. 1) by: a) separating spent cracking catalyst (128) from the vapour product stream (10) in the catalyst separating unit (2) to provide a de-catalysed vapour product stream (12); and b) cyclonically separating solid biomass residue (14) from the de-catalysed vapour product stream (12) in cyclonic residue separator (8) to provide a purified vapour product stream (124) comprising produced cracked products.

The catalyst separating unit (2) is of conventional type, comprising close-coupled first and second cyclones (4), (6) (ex. Shell) as described in US2006130443, which is incorporated herein by reference.

The first cyclone (4) has a tubular housing (16) provided with a tangentially arranged inlet (18) for receiving the vapour product stream (10), consisting of a suspension of hydrocarbon vapour and entrained finely divided solid particulate catalyst as well as fine, light, soft and non-combustible solid residues that result from catalytic cracking of biomass.

In the tubular housing (16) centrifugal motion causes solid particles to be thrown to the wall of the first cyclone where they flow downward under the force of gravity, along a frusto conical wall section (20) to a dipleg (not shown) from which they are discharged downwards. The upper end of the tubular housing of the first cyclone is provided with a cover (22). The cover (22) is provided with an axial circular opening (24) through which opening a gas outlet conduit (26) of the first cyclone protrudes. Separated vapour product (28) is removed from the first cyclone through the gas outlet conduit (26) in the cover (22) of the first cyclone (4).

Volumetric flow at the inlet (18) and the gas outlet conduit (26) of the first cyclone (4) is adjusted such that the gas velocity at the gas outlet conduit of the first cyclone is approximately 17 to 24 m/s. As a result, the first cyclone (4) leads to a remaining average particle size of approximately 40 to 70 microns.

The gas outlet conduit (26) of the first cyclone is connected to a tangentially arranged inlet (30) of the second cyclone (6). The second cyclone (6) is identical in structure to the first cyclone (4), comprising a tubular housing (32) provided with a tangentially arranged inlet (30) for receiving vapour product (28) from the first cyclone (4). In the tubular housing (32) centrifugal motion causes solid particles to be thrown to the wall of the second cyclone (6) where they flow downward under the force of gravity, along a frusto conical wall section (34) to a dipleg (not shown) from which they are discharged downwards. The upper end of the tubular housing (32) of the second cyclone (6) is provided with a cover (36). The cover (36) is provided with an axial circular opening (38) through which opening a gas outlet conduit (40) of the second cyclone (4) protrudes.

Volumetric flow at the inlet (30) and the gas outlet conduit (40) of the second cyclone is adjusted such that the gas velocity at the gas outlet conduit of the second cyclone is approximately 34 to 43 m/s. As a result, the second cyclone (6) leads to a remaining average particle size of approximately 10 to 25 microns.

Through the gas outlet conduit (40) of the second cyclone a de-catalysed vapour product stream (12), which is now poor in catalyst particles (more than 99.9 wt % has been removed) but still comprises a significant concentration of biomass residues, is discharged from the catalyst separating unit for further processing in the cyclonic residue separator, i.e. the third cyclone (8).

The third cyclone (8) is identical in structure to the first and second cyclones, comprising a tubular housing (42) provided with a tangentially arranged inlet (44) for receiving the de-catalysed vapour product stream (12) from the second cyclone (6). In the tubular housing (42) centrifugal motion causes solid particles to be thrown to the wall of the third cyclone where they flow downward under the force of gravity, along a frusto conical wall section (46) to a dipleg (not shown) from which they are discharged downwards. The upper end of the tubular housing (42) of the third cyclone is provided with a cover (48). The cover (48) is provided with an axial circular opening (50) through which opening a gas outlet conduit (52) of the third cyclone protrudes.

Volumetric flow at the inlet (44) and the gas outlet conduit (52) of the third cyclone (8) is adjusted such that the gas velocity at the gas outlet conduit of the third cyclone is approximately 45 to 80 m/s. As a result, the third cyclone (8) leads to a remaining average particle size of approximately 1 to 5 microns.

Through the gas outlet conduit (52) of the third cyclone (8) a purified vapour product stream (124), which is now poor in catalyst particles (more than 99.9 wt % catalyst) and biomass residues (remaining non-combustibles combustibles less than 0.05 wt %), is discharged into a vapour withdrawal conduit (54) for further processing by downstream product separation equipment (not shown). Removal at this stage is estimated from measured catalyst and non-combustibles in the product streams versus the estimate quantity entering the primary separation stage using the PSRI methodology.

The separator arrangement (126/226) may suitably be incorporated into a fluid catalytic cracking reactor or process.

Figure 2:
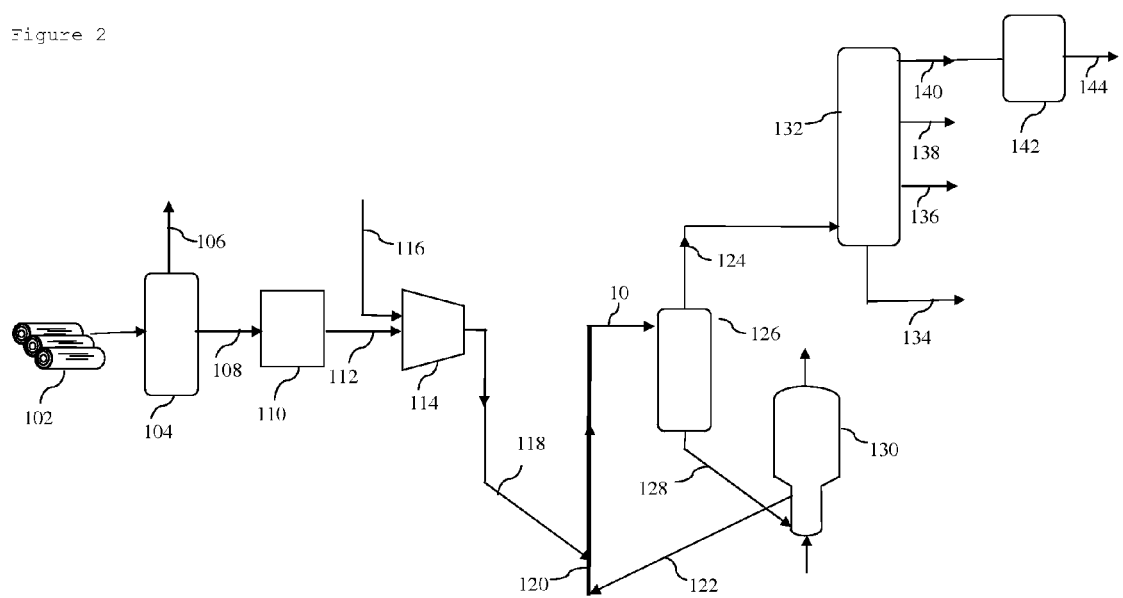
FIG. 2 shows a schematic diagram of a fluid catalytic cracking process including the separator arrangement.
Figure 3:
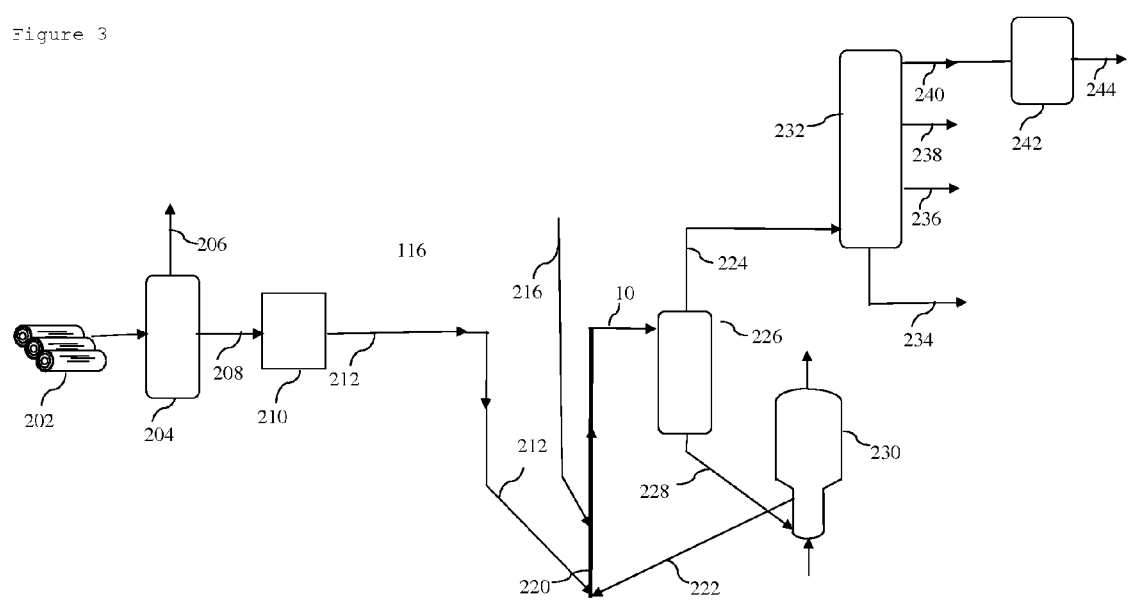
FIG. 3 shows a schematic diagram of another fluid catalytic cracking process including the separator arrangement.

Referring now to FIGS. 2 and 3, a fluid catalytic cracking process and system broadly comprises: pre-cracking steps/equipment; a reactor vessel for contacting biomass material with a fluidised solid catalytic cracking catalyst to obtain a vapour product stream including cracked products; a separator arrangement according to the first embodiment of the invention; and a number of by downstream product fractionation steps/equipment.

The processes and systems convert a biomass material into a purified vapour product stream by: pre-processing the biomass material; contacting the biomass material with a fluidised solid catalytic cracking catalyst in the presence of a fluid hydrocarbon co-feed to obtain a vapour product stream comprising one or more cracked products and solid biomass residue; purifying the vapour product stream as described in respect of the first embodiment; and fractionating and hydrodeoxygenating the vapour product stream.

Referring now specifically to FIG. 2, wood parts (102) are fed into a torrefaction unit (104), wherein the wood is torrefied to produce torrefied wood (108) and gaseous products (106) are obtained from the top. The torrefied wood (108) is forwarded to a micronizer (110), wherein the torrefied wood is micronized into micronized torrefied wood (112). The micronized torrefied wood (112) is subsequently forwarded to a mixer or extruder (114) where it is mixed with long residue as a fluid hydrocarbon co-feed (116) to produce a feed mixture (118) which is fed into the bottom of an FCC reactor riser (120). In the FCC reactor riser (120) the feed mixture (118) is contacted with new and regenerated catalytic cracking catalyst (122) at a catalytic cracking temperature. A mixture of spent catalytic cracking catalyst (128) and purified vapour product stream (124) comprising produced cracked products is separated in a separator arrangement (126) as described hereinabove in respect of the first embodiment of the invention. The spent catalytic cracking catalyst (128) is forwarded to regenerator (130), where it is regenerated and recycled to the bottom of the riser reactor as part of the regenerated catalytic cracking catalyst (122). The purified vapour product stream (124) is forwarded to a fractionator (132). In the fractionator (132) the cracked products (124) are fractionated into several product fractions, such as for example, a first fraction, which may be a gasoline containing fraction (140), a second fraction (138), a third fraction (136) and a fourth fraction (134) as shown in the figure. The number of the fractions and each of the fraction cuts may vary depending on the desired product and market demand. The gasoline containing fraction (140) is forwarded to a hydrodeoxygenation reactor (142) where it is hydrodeoxygenated over a Nickel-Molybdenum on alumina catalyst to produce a hydrodeoxygenated product (144). The hydrodeoxygenated product can be blended with one or more other components to produce a biofuel suitable for use in automotive engines.

With reference to FIG. 3, wood parts (202) are fed into a torrefaction unit (204), wherein the wood is torrefied to produce torrefied wood (208) and gaseous products (206) are obtained from the top. The torrefied wood (208) is forwarded to a micronizer (210), wherein the torrefied wood is micronized into micronized torrefied wood (212). The micronized torrefied wood (212) is fed directly into the bottom of an FCC reactor riser (220). In addition, a long residue (216) is fed to the bottom of the FCC reactor riser (220) at a position located downstream of the entry of the micronized torrefied wood (212). In the FCC reactor riser (220) the micronized torrefied wood (212) is contacted with new and regenerated catalytic cracking catalyst (222) in the presence of the long residue as a fluid hydrocarbon co-feed (216) at a catalytic cracking temperature. A mixture of spent catalytic cracking catalyst (228) and purified vapour product stream (224) comprising produced cracked products is separated in a separator arrangement (226) as described hereinabove. The spent catalytic cracking catalyst (228) is forwarded to regenerator (230), where it is regenerated and recycled to the bottom of the riser reactor as part of the regenerated catalytic cracking catalyst (222). The purified vapour product stream is forwarded to a fractionator (232). In the fractionator (232) the cracked products (224) are fractionated into several product fractions, such as for example, a first fraction, which may be a gasoline containing fraction (240), a second fraction (238), a third fraction (236) and a fourth fraction (234) as shown in the figure. The number of the fractions and each of the fraction cuts may vary depending on the desired product and market demand. The gasoline containing fraction (240) is forwarded to a hydrodeoxygenation reactor (242) where it is hydrodeoxygenated over a Nickel-Molybdenum on alumina catalyst to produce a hydrodeoxygenated product (244). The hydrodeoxygenated product can be blended with one or more other components to produce a biofuel suitable for use in automotive engines.

It will be appreciated that the embodiments are only exemplary and that a number of their features may be modified without departing from the scope of the invention.

For instance, the specific structure of the catalyst separating unit may vary and may be of any suitable type, be it cyclonic or non-cyclonic. Furthermore, whilst the main function of the catalyst separating unit is to separate spent catalyst from the vapour product stream, the skilled person will appreciate that the catalyst separating unit will also separate other solids from the vapour product stream, including some biomass residues.

Similarly, the third cyclone may take any suitable form as long as it provides for cyclonic separation of solids, especially biomass residues, from the de-catalysed vapour product stream.

By a biomass material is herein understood a material, preferably solid, obtained from a renewable source. The biomass material is herein also referred to as "biomass". By a renewable source is herein understood a composition of matter of biological origin as opposed to a composition of matter obtained or derived from petroleum, natural gas or coal. Without wishing to be bound by any kind of theory it is believed that such material obtained from a renewable source will contain carbon-14 isotope in an abundance of at least about 0.0000000001%, based on total moles of carbon.

Preferably the renewable source is a composition of matter of cellulosic or lignocellulosic origin. Any biomass material may be used in the process of the invention. In a preferred embodiment the biomass material is not a material used for food production. Examples of preferred biomass materials include aquatic plants and algae, agricultural waste and/or forestry waste and/or paper waste and/or plant material obtained from domestic waste.

Any biomass material may be used in the process of the invention. Examples of suitable biomass materials include triglycerides-containing biomass materials; pyrolysis oils; so-called liquefied biomass; solid biomass material; and/or mixtures thereof. Preferably the biomass material is a solid biomass material.

Preferably the biomass material contains cellulose and/or lignocellulosic biomass. Examples of suitable cellulose- and/or lignocellulose containing materials include agricultural wastes such as corn stover, soybean stover, corn cobs, rice straw, rice hulls, oat hulls, corn fibre, cereal straws such as wheat, barley, rye and oat straw; grasses; forestry products and/or forestry residues such as wood and wood-related materials such as sawdust; waste paper; sugar processing residues such as bagasse and beet pulp; or mixtures thereof. More preferably the biomass material is selected from the group consisting of wood, sawdust, straw, grass, bagasse, corn stover and/or mixtures thereof.

The biomass material may have undergone drying, torrefaction, steam explosion, particle size reduction, densification and/or pelletization before being contacted with the catalyst, to allow for improved process operability and economics.

Preferably the biomass material is a torrefied solid biomass material. In a preferred embodiment the process according to the invention comprises a step of torrefying the solid biomass material at a temperature of more than 200° C. to produce a torrefied solid biomass material that is subsequently contacted with the catalytic cracking catalyst.

By torrefying or torrefaction is herein understood the treatment of the solid biomass material at a temperature in the range from equal to or more than 200° C. to equal to or less than 350° C. in the essential absence of a catalyst and in an oxygen-poor, preferably an oxygen-free, atmosphere. By an oxygen-poor atmosphere is understood an atmosphere containing equal to or less than 15 vol. % oxygen, preferably equal to or less than 10 vol. % oxygen and more preferably equal to or less than 5 vol. % oxygen. By an oxygen-free atmosphere is understood that the torrefaction is carried out in the essential absence of oxygen.

Torrefying of the solid biomass material is preferably carried out at a temperature of more than 200° C., more preferably at a temperature equal to or more than 210° C., still more preferably at a temperature equal to or more than 220° C., yet more preferably at a temperature equal to or more than 230° C. In addition torrefying of the solid biomass material is preferably carried out at a temperature less than 350° C., more preferably at a temperature equal to or less than 330° C., still more preferably at a temperature equal to or less than 310° C., yet more preferably at a temperature equal to or less than 300° C.

Torrefaction of the solid biomass material is preferably carried out in the essential absence of oxygen. More preferably the torrefaction is carried under an inert atmosphere, containing for example inert gases such as nitrogen, carbon dioxide and/or steam; and/or under a reducing atmosphere in the presence of a reducing gas such as hydrogen, gaseous hydrocarbons such as methane and ethane or carbon monoxide.

The torrefying step may be carried out at a wide range of pressures. Preferably, however, the torrefying step is carried out at atmospheric pressure (about 1 bar absolute, corresponding to about 0.1 MegaPascal).

The torrefying step may be carried out batchwise or continuously. If operated batchwise, a torrefaction reactor may be filled with solid biomass material, whereafter the solid biomass material in the torrefaction reactor may be heated at the torrefaction temperature for a time period in the range from 1 minute to 12 hours, more preferably for a period in the range from 30 minutes to 8 hours and most preferably for a period in the range from 1 to 6 hours. Hereafter the torrefaction reactor may be cooled down and emptied to start a new cycle.

If operated continuously, for example the TORSPYD (trademark) process of Thermya may be used, wherein a flow of solid biomass material flows from top to bottom in a reactor column, counter-currently to a flow of gas flowing from bottom to top of the reactor column. The temperature of the reactor column gradually increases from top to bottom. Residence time for the solid biomass material in the torrefaction reactor may lie in the range from equal to or more than 0.5 minute, more preferably equal to or more than 5 minutes and most preferably equal to or more than 15 minutes to equal to or less than 2 hours, more preferably equal to or less than 1 hour and most preferably equal to or less than 45 minutes.

The torrefied solid biomass material has a higher energy density, a higher mass density and greater flowability, making it easier to transport, pelletize and/or store. Being more brittle, it can be easier reduced into smaller particles.

Preferably the torrefied solid biomass material has an oxygen content in the range from equal to or more than 10 wt %, more preferably equal to or more than 20 wt % and most preferably equal to or more than 30 wt % oxygen, to equal to or less than 60 wt %, more preferably equal to or less than 50 wt %, based on total weight of dry matter (i.e. water-free matter).

During torrefaction of the solid biomass material torrefaction gases can be produced. These torrefaction gases can contain carbon monoxide and carbon dioxide but also volatile fuels such as for example methane, ethane, ethene and/or methanol. In a preferred embodiment according to this invention, these volatile fuels are retrieved from the torrefaction gases and recycled to the process as a fuel to provide at least part of the heat for the torrefaction and/or the catalytic cracking. In a further embodiment carbon monoxide and/or carbon dioxide may be retrieved from the torrefaction gases and recycled to provide the inert or reducing atmosphere for torrefaction.

In a further preferred embodiment, any torrefying or torrefaction step further comprises drying the solid biomass material before such solid biomass material is torrefied. In such a drying step, the solid biomass material is preferably dried until the solid biomass material has a moisture content in the range of equal to or more than 0.1 wt % to equal to or less than 25 wt %, more preferably in the range of equal to or more than 5 wt % to equal to or less than 20 wt %, and most preferably in the range of equal to or more than 5 wt % to equal to or less than 15 wt %. For practical purposes moisture content can be determined via ASTM E1756-01 Standard Test method for Determination of Total solids in Biomass. In this method the loss of weight during drying is a measure for the original moisture content.

Preferably the biomass material is a micronized solid biomass material. By a micronized solid biomass material is herein understood a solid biomass material that has a particle size distribution with a mean particle size in the range from equal to or more than 5 micrometer to equal to or less than 5000 micrometer, as measured with a laser scattering particle size distribution analyzer. Aspects of the invention encompass a step of reducing the particle size of the solid biomass material, optionally before or after such solid biomass material is torrefied. Such a particle size reduction step may for example be especially advantageous when the solid biomass material comprises wood or torrefied wood. The particle size of the, optionally torrefied, solid biomass material can be reduced in any manner known to the skilled person to be suitable for this purpose. Suitable methods for particle size reduction include crushing, grinding and/or milling. The particle size reduction may preferably be achieved by means of a ball mill, hammer mill, (knife) shredder, chipper, knife grid, or cutter.

Preferably the solid biomass material has a particle size distribution where the mean particle size lies in the range from equal to or more than 1 micrometer (micron), more preferably equal to or more than 10 micrometer, even more preferably equal to or more than 20 micrometer, and most preferably equal to or more than 100 micrometer to equal to or less than 5000 micrometer, more preferably equal to or less than 1000 micrometer and most preferably equal to or less than 500 micrometer.

Most preferably the solid biomass material has a particle size distribution where the mean particle size is equal to or more than 100 micrometer to avoid blocking of pipelines and/or nozzles. Most preferably the solid biomass material has a particle size distribution where the mean particle size is equal to or less than 3000 micrometer to allow easy injection into a riser reactor.

For practical purposes the particle size distribution and mean particle size of the solid biomass material can be determined with a Laser Scattering Particle Size Distribution Analyzer, preferably a Horiba LA950, according to the ISO 13320 method titled "Particle size analysis—Laser diffraction methods".

Hence, preferably the process of the invention comprises a step of reducing the particle size of the solid biomass material, optionally before and/or after torrefaction, to generate a particle size distribution having a mean particle size in the range from equal to or more than 5, more preferably equal to or more than 10 micron, and most preferably equal to or more than 20 micron, to equal to or less than 5000 micron, more preferably equal to or less than 1000 micrometer and most preferably equal to or less than 500 micrometer to produce a micronized, optionally torrefied, solid biomass material.

In an optional embodiment the particle size reduction of the, optionally torrefied, solid biomass material is carried out whilst having the solid biomass material suspended in a hydro-carbon-containing liquid or in water, to improve processibility and/or avoid dusting.

In a preferred embodiment the, optionally micronized and optionally torrefied, solid biomass material is dried before being supplied to the riser reactor. Hence, if the solid biomass material is torrefied, it may be dried before and/or after torrefication. If dried before use as a feed to the riser reactor, the solid biomass material is preferably dried at a temperature in the range from equal to or more than 50° C. to equal to or less than 200° C., more preferably in the range from equal to or more than 80° C. to equal to or less than 150° C. The, optionally micronized and/or torrefied, solid biomass material is preferably dried for a period in the range from equal to or more than 30 minutes to equal to or less than 2 days, more preferably for a period in the range from equal to or more than 2 hours to equal to or less than 24 hours.

Upon fluid catalytic cracking, biomass material typically forms a solid biomass residue, in addition to vapour products. Such biomass residue is non-combustible and may, for example, comprise ash, char and/or other non-combustibles. Biomass residue may, for example, have an average particle size in the range of from 0.1 to 1000, especially 1 to 100, or even 1 to 10 micron. Typically, biomass residue has a hardness of less than 20 HBS (Brinell Harness number), especially less than 10 HBS, or even less than 5 HBS. It has been found that, whilst the typically small particle sizes of biomass residue mean that separation from the vapour product stream during catalyst separation steps is generally insufficiently effective, the solid biomass residue can be separated cyclonically at high gas velocities without excessive cyclonic wear on account of its softness.

The biomass material may preferably be subjected to fluid catalytic cracking in the presence of a co-feed, which may be a hydrocarbon-containing fluid (herein also referred to as fluid hydrocarbon feed or fluid hydrocarbon co-feed). By a hydrocarbon-containing fluid or a fluid hydrocarbon feed is herein preferably understood a fluid or feed comprising one or more hydrocarbon compounds. By a hydrocarbon compound is herein preferably understood a compound that contains hydrogen and carbon and preferably consists of hydrogen and carbon.

By a hydrocarbon-containing fluid respectively a fluid hydrocarbon feed is herein understood a hydrocarbon-containing composition or a hydrocarbon feed that is not solid.

Preferably the hydrocarbon-containing fluid comprises straight run (atmospheric) gas oils, flashed distillate, vacuum gas oils (VGO), coker gas oils, gasoline, naphtha, diesel, kerosene, atmospheric residue ("long residue") and vacuum residue ("short residue") and/or mixtures thereof. Most preferably the hydrocarbon-containing liquid comprises gasoline, naphtha, diesel, kerosene, and/or mixtures thereof.

The composition of the fluid hydrocarbon feed may vary widely. The fluid hydrocarbon feed may for example contain paraffins, naphthenes (a sub-class of paraffins), olefins and/or aromatics.

In one preferred embodiment the fluid hydrocarbon feed comprises equal to or more than 50 wt %, more preferably equal to or more than 75 wt %, and most preferably equal to or more than 90 wt % of compounds consisting only of carbon and hydrogen, based on the total weight of the fluid hydrocarbon feed.

Preferably the fluid hydrocarbon feed comprises equal to or more than 1 wt % paraffins, more preferably equal to or more than 5 wt % paraffins, and most preferably equal to or more than 10 wt % paraffins, and preferably equal to or less than 100 wt % paraffins, more preferably equal to or less than 90 wt % paraffins, and most preferably equal to or less than 30 wt % paraffins, based on the total fluid hydrocarbon feed. By paraffins both normal-, cyclo- and branched-paraffins are understood.

In another embodiment the fluid hydrocarbon feed comprises or consists of a paraffinic fluid hydrocarbon feed. By a paraffinic fluid hydrocarbon feed is herein understood a fluid hydrocarbon feed comprising at least 50 wt % of paraffins, preferably at least 70 wt % of paraffins, based on the total weight of the fluid hydrocarbon feed.

For practical purposes the paraffin content of all fluid hydrocarbon feeds having an initial boiling point of at least 260° C. can be measured by means of ASTM method D2007-03 titled "Standard test method for characteristic groups in rubber extender and processing oils and other petroleum-derived oils by clay-gel absorption chromatographic method", wherein the amount of saturates will be representative for the paraffin content. For all other fluid hydrocarbon feeds the paraffin content of the fluid hydrocarbon feed can be measured by means of comprehensive multi-dimensional gas chromatography (GC×GC), as described in P. J. Schoenmakers, J. L. M. M. Oomen, J. Blomberg, W. Genuit, G. van Velzen, J. Chromatogr. A, 892 (2000) p. 29 and further.

Examples of paraffinic fluid hydrocarbon feeds include so-called Fischer-Tropsch derived hydrocarbon streams such as described in WO2007/090884 and herein incorporated by reference, or a hydrogen rich feed like hydrotreater product or hydrowax. By Hydrowax is understood the bottoms fraction of a hydrocracker. Examples of hydrocracking processes which may yield a bottoms fraction that can be used as fluid hydrocarbon feed, are described in EP-A-699225, EP-A-649896, WO-A-97/18278, EP-A-705321, EP-A-994173 and U.S. Pat. No. 4,851,109 and herein incorporated by reference.

The weight ratio of the biomass material to fluid hydrocarbon feed may vary widely. For ease of co-processing the weight ratio of fluid hydrocarbon feed to biomass material is preferably equal to or more than 50 to 50 (5:5), more preferably equal to or more than 70 to 30 (7:3), still more preferably equal to or more than 80 to 20 (8:2), even still more preferably equal to or more than 90 to 10 (9:1). For practical purposes the weight ratio of fluid hydrocarbon feed to biomass material is preferably equal to or less than 99.9 to 0.1 (99.9:0.1), more preferably equal to or less than 95 to 5 (95:5). The fluid hydrocarbon feed and the biomass material are preferably being fed to the riser reactor in a weight ratio within the above ranges.

The amount of biomass material, based on the total weight of biomass material and fluid hydrocarbon feed supplied to the riser reactor, is preferably equal to or less than 30 wt %, more preferably equal to or less than 20 wt %, most preferably equal to or less than 10 wt % and even more preferably equal to or less than 5 wt %. For practical purposes the amount of biomass material present, based on the total weight of biomass material and fluid hydrocarbon feed supplied to the riser reactor, is preferably equal to or more than 0.1 wt %, more preferably equal to or more than 1 wt %.

In a preferred embodiment the fluid hydrocarbon feed comprises equal to or more than 8 wt % elemental hydrogen (i.e. hydrogen atoms), more preferably more than 12 wt % elemental hydrogen, based on the total fluid hydrocarbon feed on a dry basis (i.e. water-free basis). A high content of elemental hydrogen, such as a content of equal to or more than 8 wt %, allows the hydrocarbon feed to act as a cheap hydrogen donor in the catalytic cracking process. A particularly preferred fluid hydrocarbon feed having an elemental hydrogen content of equal to or more than 8 wt % is Fischer-Tropsch derived waxy raffinate. Such Fischer-Tropsch derived waxy raffinate may for example comprise about 85 wt % of elemental carbon and 15 wt % of elemental hydrogen.

Without wishing to be bound by any kind of theory it is further believed that a higher weight ratio of fluid hydrocarbon feed to biomass material enables more upgrading of the biomass material by hydrogen transfer reactions.

The biomass material is preferably contacted with a catalytic cracking catalyst (i.e. the fluidized solid catalyst) in a riser reactor. By a riser reactor is herein understood an elongated, preferably tube-like, reactor suitable for carrying out catalytic cracking reactions. Suitably a fluidized catalytic cracking catalyst flows in the riser reactor from the upstream end to the downstream end of the reactor. The elongated, preferably tube-like, reactor is preferably oriented in an essentially vertical manner. Suitably, a fluidized catalytic cracking catalyst flows from the bottom of the riser reactor upwards to the top of the riser reactor.

Preferably the riser reactor is part of a catalytic cracking unit (i.e. as a catalytic cracking reactor), more preferably a fluidized catalytic cracking (FCC) unit.

Examples of suitable riser reactors are described in the Handbook titled "Fluid Catalytic Cracking technology and operations", by Joseph W. Wilson, published by PennWell Publishing Company (1997), chapter 3, especially pages 101 to 112, herein incorporated by reference.

The riser reactor may be a so-called internal riser reactor or a so-called external riser reactor as described therein.

Preferably the temperature at the location where the biomass material is supplied to the riser reactor lies in the range from equal to or more than 500° C., more preferably equal to or more than 550° C., and most preferably equal to or more than 600° C., to equal to or less than 800° C., more preferably equal to or less than 750° C.

In certain embodiments it can be advantageous to supply the biomass material to a location in the riser reactor where the temperature is slightly higher, for example where the temperature lies in the range from equal to or more than 700° C., more preferably equal to or more than 720° C., even more preferably equal to or more than 732° C. to equal to or less than 800° C., more preferably equal to or less than 750° C. Without wishing to be bound by any kind of theory, it is believed this may lead to a quicker conversion of the biomass material into the intermediate oil product.

Preferably the pressure in the riser reactor ranges from equal to or more than 0.5 bar absolute to equal to or less than 10 bar absolute (0.05 MegaPascal-1.0 MegaPascal), more preferably from equal to or more than 1.0 bar absolute to equal to or less than 6 bar absolute (0.1 MegaPascal to 0.6 MegaPascal).

Preferably the total average residence time of the biomass material lies in the range from equal to or more than 0.1 second, more preferably equal to or more than 10 seconds and even more preferably equal to or more than 2 seconds to equal to or less than 10 seconds, preferably equal to or less than 5 seconds and more preferably equal to or less than 4 seconds.

Residence time as referred to in this patent application is based on the vapour residence at outlet conditions, that is, residence time includes not only the residence time of a specified feed (such as the biomass material) but also the residence time of its conversion products.

The weight ratio of catalyst to biomass material (catalyst: biomass material ratio) at the location where the biomass material is supplied to the riser reactor preferably lies in the range from equal to or more than 1:1, more preferably from equal to or more than 2:1 and most preferably from equal to or more than 3:1 to equal to or less than 150:1, more preferably to equal to or less than 100:1, even more preferably to equal to or less than 50:1, most preferably to equal to or less than 20:1.

The biomass material and the fluid hydrocarbon feed can be supplied to the riser reactor in any manner known to the person skilled in the art. Preferably, however the biomass material is supplied to the riser reactor with the help of a screw feeder or pneumatic transporter.

The catalytic cracking catalyst can be any catalyst known to the skilled person to be suitable for use in a cracking process. Preferably, the catalytic cracking catalyst comprises a zeolitic component. In addition, the catalytic cracking catalyst can contain an amorphous binder compound and/or a filler. Examples of the amorphous binder component include silica, alumina, titania, zirconia and magnesium oxide, or combinations of two or more of them. Examples of fillers include clays (such as kaolin).

The zeolite is preferably a large pore zeolite. The large pore zeolite includes a zeolite comprising a porous, crystalline aluminosilicate structure having a porous internal cell structure on which the major axis of the pores is in the range of 0.62 nanometer to 0.8 nanometer. The axes of zeolites are depicted in the 'Atlas of Zeolite Structure Types', of W. M. Meier, D. H. Olson, and Ch. Baerlocher, Fourth Revised Edition 1996, Elsevier, ISBN 0-444-10015-6. Examples of such large pore zeolites include FAU or faujasite, preferably synthetic faujasite, for example, zeolite Y or X, ultra-stable zeolite Y (USY), Rare Earth zeolite Y (=REY) and Rare Earth USY (REUSY). According to the present invention USY is preferably used as the large pore zeolite.

The catalytic cracking catalyst can also comprise a medium pore zeolite. The medium pore zeolite that can be used according to the present invention is a zeolite comprising a porous, crystalline aluminosilicate structure having a porous internal cell structure on which the major axis of the pores is in the range of 0.45 nanometer to 0.62 nanometer. Examples of such medium pore zeolites are of the MFI structural type, for example, ZSM-5; the MTW type, for example, ZSM-12; the TON structural type, for example, theta one; and the FER structural type, for example, ferrierite. According to the present invention, ZSM-5 is preferably used as the medium pore zeolite.

According to another embodiment, a blend of large pore and medium pore zeolites may be used. The ratio of the large pore zeolite to the medium pore size zeolite in the cracking catalyst is preferably in the range of 99:1 to 70:30, more preferably in the range of 98:2 to 85:15.

The total amount of the large pore size zeolite and/or medium pore zeolite that is present in the cracking catalyst is preferably in the range of 5 wt % to 40 wt %, more preferably in the range of 10 wt % to 30 wt %, and even more preferably in the range of 10 wt % to 25 wt % relative to the total mass of the catalytic cracking catalyst.

Preferably, the biomass material and the fluid hydrocarbon feed flow co-currently in the same direction. The catalytic cracking catalyst can be contacted in a cocurrent-flow, countercurrent-flow or cross-flow configuration with such a flow of the biomass material and the fluid hydrocarbon feed. Preferably the catalytic cracking catalyst is contacted in a cocurrent flow configuration with a cocurrent flow of the biomass material and the fluid hydrocarbon feed.

In a preferred embodiment the process according to the invention comprises:

a catalytic cracking step comprising contacting the biomass material and the fluid hydrocarbon feed with a catalytic cracking catalyst at a temperature of more than 400° C. in a riser reactor to produce one or more cracked products and a spent catalytic cracking catalyst;

a separation step comprising separating the one or more cracked products from the spent catalytic cracking catalyst and biomass residue as described hereinabove; a regeneration step comprising regenerating spent catalytic cracking catalyst to produce a regenerated catalytic cracking catalyst, heat and carbon dioxide; and a recycle step comprising recycling the regenerated catalytic cracking catalyst to the catalytic cracking step.

The separation step may suitably comprise a method as described herein before. In this preferred embodiment the vapour product stream comprises the one or more cracked products. That is, the separation step suitably comprises purifying a vapour product stream (i.e. the one or more cracked products) obtained from cracking of biomass catalysed by a fluidised solid catalyst (i.e. the catalytic cracking catalyst), the method comprising:

a) separating catalyst from the vapour product stream to provide a de-catalysed vapour product stream; and b) cyclonically separating solid biomass residue from the de-catalysed vapour product stream to provide a purified vapour product stream, wherein cyclonically separating solid biomass residue comprises bringing the de-catalysed vapour product stream to a gas velocity in the range of from 35 to 80 m/s.

The separation step may further comprise a stripping step. In such a stripping step the spent catalyst may be stripped to recover the products absorbed on the spent catalyst before the regeneration step. These products may be recycled and added to the cracked product stream obtained from the catalytic cracking step.

The regeneration step preferably comprises contacting the spent catalytic cracking catalyst with an oxygen containing gas in a regenerator at a temperature of equal to or more than 550° C. to produce a regenerated catalytic cracking catalyst, heat and carbon dioxide. During the regeneration coke, that can be deposited on the catalyst as a result of the catalytic cracking reaction, is burned off to restore the catalyst activity.

The oxygen containing gas may be any oxygen containing gas known to the skilled person to be suitable for use in a regenerator. For example the oxygen containing gas may be air or oxygen-enriched air. By oxygen enriched air is herein understood air comprising more than 21 vol. % oxygen ($O_2$), more preferably air comprising equal to or more than 22 vol. % oxygen, based on the total volume of air.

The heat produced in the exothermic regeneration step is preferably employed to provide energy for the endothermic catalytic cracking step. In addition the heat produced can be used to heat water and/or generate steam. The steam may be used elsewhere in the refinery, for example as a liftgas in the riser reactor. Preferably the liftgas in the riser reactor consists of steam.

Preferably the spent catalytic cracking catalyst is regenerated at a temperature in the range from equal to or more than 575° C., more preferably from equal to or more than 600° C., to equal to or less than 950° C., more preferably to equal to or less than 850° C. Preferably the spent catalytic cracking catalyst is regenerated at a pressure in the range from equal to or more than 0.5 bar absolute to equal to or less than 10 bar absolute (0.05 MegaPascal to 1.0 MegaPascal), more preferably from equal to or more than 1.0 bar absolute to equal to or less than 6 bar absolute (0.1 MegaPascal to 0.6 MegaPascal).

The regenerated catalytic cracking catalyst can be recycled to the catalytic cracking step. In a preferred embodiment a side stream of make-up catalyst is added to the recycle stream to make-up for loss of catalyst in the reaction zone and regenerator.

In the process according to the invention one or more cracked products are produced. In a preferred embodiment this/these one or more cracked products is/are subsequently fractionated to produce one or more product fractions.

As indicated herein, the one or more cracked products may contain one or more oxygen-containing-hydrocarbons. Examples of such oxygen-containing-hydrocarbons include ethers, esters, ketones, acids and alcohols. In specific the one or more cracked products may contain phenols.

Fractionation may be carried out in any manner known to the skilled person in the art to be suitable for fractionation of products from a catalytic cracking unit. For example the fractionation may be carried out as described in the Handbook titled "Fluid Catalytic Cracking technology and operations", by Joseph W. Wilson, published by PennWell Publishing Company (1997), chapter 8, especially pages 223 to 235, herein incorporated by reference.

In a further embodiment at least one of the one or more product fractions obtained by fractionation are subsequently hydrodeoxygenated to produce a biofuel and/or biochemical component.

In a further embodiment at least one of the one or more product fractions obtained by fractionation are subsequently hydrodeoxygenated to produce a hydrodeoxygenated product fraction.

The one or more product fractions may contain one or more oxygen-containing-hydrocarbons. Examples of such oxygen-containing-hydrocarbons include ethers, esters, ketones, acids and alcohols. In specific one or more product fractions may contain phenols and/or substituted phenols.

By hydrodeoxygenation is herein understood reducing the concentration of oxygen-containing hydrocarbons in one or more product fraction(s) containing oxygen-containing hydrocarbons by contacting the one or more product fraction(s) with hydrogen in the presence of a hydrodeoxygenation catalyst. Oxygen-containing hydrocarbons that can be removed include acids, ethers, esters, ketones, aldehydes, alcohols (such as phenols) and other oxygen-containing compounds.

In addition to the hydrodeoxygenation, the one or more product fractions may be subjected to hydrodesulphurization, hydrodenitrogenation, hydrocracking and/or hydroisomerization. Such hydrodesulphurization, hydrodenitrogenation, hydrocracking and/or hydroisomerization may be carried out before, after and/or simultaneously with the hydrodeoxygenation.

In a preferred embodiment the one or more product fractions produced in the fractionation; and/or the one or more hydrodeoxygenated product(s) produced in the hydrodeoxygenation can be blended as a biofuel component and/or a biochemical component with one or more other components to produce a biofuel and/or a biochemical. Examples of one or more other components with which the one or more hydrodeoxygenated product(s) may be blended include anti-oxidants, corrosion inhibitors, ashless detergents, dehazers, dyes, lubricity improvers and/or mineral fuel components, but also conventional petroleum derived gasoline, diesel and/or kerosene fractions.

Alternatively the one or more product fractions and/or the one or more hydrodeoxygenated product(s) can be used as an intermediate in the preparation of a biofuel component and/or a biochemical component. In such a case the biofuel component and/or biochemical component may be subsequently blended with one or more other components (as listed above) to prepare a biofuel and/or a biochemical.

By a biofuel respectively a biochemical is herein understood a fuel or a chemical that is at least party derived from a renewable energy source.

What is claimed is:

1. A method of purifying a vapour product stream obtained from cracking of biomass catalysed by a fluidised solid catalyst, the method comprising:
    a) separating catalyst from the vapour product stream to provide a de-catalysed vapour product stream; and
    b) cyclonically separating solid biomass residue from the de-catalysed vapour product stream to provide a purified vapour product stream, wherein cyclonically separating solid biomass residue comprises bringing the de-catalysed vapour product stream to a gas velocity in the range of from 35 to 80 m/s.

2. The method of claim 1 wherein in step a) the separation of catalyst from the vapour product stream comprises passing the vapour product stream through a plurality of primary cyclonic separators linked in series.

3. The method of claim 1 wherein in step b) the cyclonically separating solid biomass residue comprises bringing the de-catalysed vapour product stream to a peak gas velocity.

4. The method of claim 1 comprising separating catalyst from the vapour product stream in step a) to achieve a primary average particle size in the de-catalysed vapour product stream, and cyclonically separating solid biomass residue from the de-catalysed vapour product stream in step b) to achieve an average particle size in the purified vapour product stream that is lower than the primary average particle size.

5. The method of claim 1 comprising separating catalyst from the vapour product stream in step a) to achieve a primary average particle size in the de-catalysed vapour product stream in the range of from 10 to 50 microns.

6. The method of claim 1 comprising separating at least 98 wt % of the catalyst from the vapour product stream to provide the de-catalysed vapour product stream in step a).

7. The method of claim 1 wherein the gas velocity in step b) is by at least 5% higher than the gas velocity in step a).

8. A process for converting a biomass material into a purified vapour product stream, the process comprising:
    contacting the biomass material with a fluidised solid catalytic cracking catalyst to obtain a vapour product stream comprising at least one cracked products and solid biomass residue; and
    purifying the vapour product stream according to the process of claim 1 to provide a purified product stream.

9. The process of claim 8 wherein the biomass is contacted with the catalytic cracking catalyst at a temperature of more than 400° C. in the presence of a fluid hydrocarbon co-feed.

10. A separator arrangement for separating solids from a vapour product stream obtained from cracking of biomass catalysed by a fluidised solid catalyst, the separator arrangement comprising:
    (i) a catalyst separating unit for separating solid catalyst from the vapour product stream to provide a de-catalysed vapour product stream, wherein the catalyst separating unit comprises at least two primary cyclonic separators linked in series; and
    (ii) a cyclonic residue separator for separating solid biomass residue from the de-catalysed vapour product stream that is operatively connected to an outlet of the catalyst separation unit, wherein the cyclonic residue separator comprises at least one primary cyclonic separator.

11. The separator arrangement of claim 10 wherein the catalyst separator unit is arranged to separate at least 98 wt % of the catalyst from the vapour product stream to provide the de-catalysed vapour product stream.

12. The separator arrangement of claim 10 wherein the cyclonic residue separator and the primary cyclonic separators are arranged such that the cyclonic residue separator operates at a gas velocity which is higher than the gas velocities of the primary cyclonic separators.

13. The separator arrangement of claim 10 wherein the cyclonic residue separator has a lower cut point and/or leads to a lower remaining average particle size than the primary cyclonic separators.

14. A fluid catalytic cracking reactor or unit for converting a biomass material into a purified vapour product stream, the reactor or unit comprising:
- a reactor vessel containing biomass material and a fluidised solid catalytic cracking catalyst; and
- a separator arrangement according to claim 9 that is operatively connected to the reactor vessel.

* * * * *